US012776511B2

(12) United States Patent
Chen et al.

(10) Patent No.: US 12,776,511 B2
(45) Date of Patent: Oct. 27, 2026

(54) HIGH-ENERGY AND HIGH POWER COMPOSITE CATHODES FOR ALL SOLID-STATE BATTERIES

(71) Applicant: The Regents of the University of California, Oakland, CA (US)

(72) Inventors: Guoying Chen, Oakland, CA (US); Se Young Kim, Emeryville, CA (US); Yanying Lu, El Cerrito, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 923 days.

(21) Appl. No.: 17/838,457

(22) Filed: Jun. 13, 2022

(65) Prior Publication Data

US 2022/0399569 A1 Dec. 15, 2022

Related U.S. Application Data

(63) Continuation-in-part of application No. 17/834,076, filed on Jun. 7, 2022.

(Continued)

(51) Int. Cl.

*H01M 10/0562* (2010.01)
*H01M 4/134* (2010.01)

(Continued)

(52) U.S. Cl.

CPC ....... *H01M 10/0562* (2013.01); *H01M 4/134* (2013.01); *H01M 4/525* (2013.01); *H01M 10/0525* (2013.01); *H01M 2300/008* (2013.01)

(58) Field of Classification Search

CPC .. H01M 10/0562; H01M 4/134; H01M 4/525; H01M 10/0525; H01M 2300/008; H01M 4/62; H01M 4/625; Y02E 60/10

See application file for complete search history.

(56) References Cited

U.S. PATENT DOCUMENTS

| | | | |
|---|---|---|---|
| 4,307,163 A | 12/1981 | Joshi et al. | |
| 2020/0350624 A1 | 11/2020 | Sasaki et al. | |

(Continued)

FOREIGN PATENT DOCUMENTS

| | | | | |
|---|---|---|---|---|
| CN | 110970667 A | | 4/2020 | |
| CN | 112952184 A | * | 6/2021 | ............ H01M 4/386 |

(Continued)

OTHER PUBLICATIONS

Machine Translation of CN-112952184-A (Year: 2021).*

(Continued)

*Primary Examiner* — Nicole M. Buie-Hatcher
*Assistant Examiner* — Kenneth Max Otero

(57) ABSTRACT

This disclosure provides systems, methods, and apparatus related to composite cathodes for all solid-state batteries. In one aspect, an all solid-state battery comprises a composite cathode, a separator, and an anode. The composite cathode comprises $LiNi_xMn_yCo_{1-x-y}O_2$, x≥0.33, with about 80% or more of the $LiNi_xMn_yCo_{1-x-y}O_2$ comprising single crystals of $LiNi_xMn_yCo_{1-x-y}O_2$. The $LiNi_xMn_yCo_{1-x-y}O_2$ is embedded in a matrix of a first lithium metal halide solid electrolyte comprising $Li_{6-3a}M_aX_6$, 0<a<2. M is an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof. X is a halide from a group of chlorine (Cl), bromine (Br), iodine (I), and combinations thereof.

20 Claims, 10 Drawing Sheets

Related U.S. Application Data

(60) Provisional application No. 63/277,722, filed on Nov. 10, 2021, provisional application No. 63/210,335, filed on Jun. 14, 2021.

(51) Int. Cl.
*H01M 4/525* (2010.01)
*H01M 10/0525* (2010.01)

(56) References Cited

U.S. PATENT DOCUMENTS

| | | | |
|---|---|---|---|
| 2020/0350626 A1 | 11/2020 | Matsumura et al. | |
| 2021/0098825 A1 | 4/2021 | Sakaida et al. | |
| 2021/0126284 A1 | 4/2021 | Sakaida et al. | |
| 2021/0175509 A1* | 6/2021 | Lai | H01M 4/525 |

FOREIGN PATENT DOCUMENTS

| | | | | |
|---|---|---|---|---|
| EP | 3113252 B1 | 6/2016 | | |
| WO | WO 2020/070957 A1 | 4/2020 | | |
| WO | WO 2021/089680 A1 | 5/2021 | | |
| WO | WO 2021/089693 A1 | 5/2021 | | |
| WO | WO 2021/198183 A1 | 10/2021 | | |
| WO | WO 2022094412 A * | 5/2022 | | H01M 10/0468 |
| WO | WO-2022094412 A1 * | 5/2022 | | H01M 10/0585 |

OTHER PUBLICATIONS

CN112952184 (Machine Translation) (Year: 2025).*
WO2022094412A1 (With Paragraph Numbers) (Year: 2025).*
Xiaona et al. (Royal Society of Chemistry, Air-stable Li3InCl6 electrolyte with high voltage compatibility for all-solid-state batteries) (Year: 2019) (Year: 2019).*
CN_112952184_A _—_ Machine_Translation (Year: 2025).*
WO2022094412A1—Machine Translation (Year: 2025).*
Xiaona et al. (Royal Society of Chemistry, Air-stable Li3InCl6 electrolyte with high voltage compatibility for all-solid-state batteries) (Year: 2019).*
Liu et al. (Electrochemo-Mechanical Effects on Structural Integrity of Ni-Rich Cathodes with Different Microstructures in All Solid-State Batteries, Adv. Energy Mater. 2021, 11, 2003583) (Year: 2021).*
Wang et al. (Single crystal cathodes enabling high-performance all-solid-state lithium-ion batteries, Energy Storage Materials 30 (2020) 98-103) (Year: 2020).*
Zhu et al. (Journal of Materials Chemistry A, Single-Crystal Based Studies for Correlating Properties and High-Voltage Performance of LiNixMnyCo1-x-y O2 Cathodes) (Year: 2019).*
Park et al., "Theoretical Design of Lithium Chloride Superionic Conductors for All-Solid-State High-Voltage Lithium-Ion Batteries," ACS Applied Materials and Interfaces, vol. 12, pp. 34806-34814, (Jul. 9, 2020).
Qian et al., "Temperature-Swing Synthesis of Large-Size Single-Crystal LiNi0.6Mn0.2Co0.2O2 Cathode Materials," Journal of the Electrochemical Society, vol. 168, pp. 010534, (Jan. 29, 2021).
Fantin et al., "Synthesis and Postprocessing of Single-Crystalline LiNi0.8Co0.15Al0.05O2 for Solid-State Lithium-Ion Batteries with HighCapacity and Long Cycling Stability," Chemistry of Materials, vol. 33, pp. 2624-2634, (Mar. 27, 2021).
Xu et al., "Origin of high electrochemical stability of multi-metal chloride solid electrolytes for high energy all-solid-state lithium-ion batteries," Nano Energy, vol. 92, pp. 106674 (1 of 12), (Oct. 28, 2021).
Cao et al., "Long-Cycling Sulfide-Based All-Solid-State Batteries Enabled by Electrochemo-Mechanically Stable Electrodes," Advanced Materials, vol. 34, pp. 2200401 (1 of 15), (2022).
Doerrer et al., "High Energy Density Single-Crystal NMC/Li6PS5Cl Cathodes for All-Solid-State Lithium-Metal Batteries," ACS Applied Materials and Interfaces, vol. 13, pp. 37809-37815, (Jul. 29, 2021).
Kwak et al., "Emerging Halide Superionic Conductors for All-Solid-State Batteries: Design, Synthesis, and Practical Applications," Energy Letters, vol. 7, pp. 1776-1805, (Apr. 26, 2022).
Wu et al., "Current status and future directions of all-solid-state batteries with lithium metal anodes, sulfide electrolytes, and layered transition metal oxide cathodes," Nano Energy, vol. 87, pp. 106081(1-23), (Apr. 15, 2021).
Liu et al., "Constructing a High-Energy and Durable Single-Crystal NCM811Cathode for All-Solid-State Batteries by a Surface Engineering Strategy," ACS Applied Materials and Interfaces, pp. 41669-41679, (Aug. 25, 2021).
Langdon et al., "A perspective on single-crystal layered oxide cathodes for lithium-ion batteries," Energy Storage Materials, vol. 37, pp. 143-160, (Feb. 1, 2021).
Ye et al., "A dynamic stability design strategy for lithium metal solid state batteries," Nature, vol. 593, pp. 222 (1-17), (May 12, 2021).
Lu et al., "Single-Crystal LiNixMnyCo1- x- yO2 Cathodes for Extreme Fast Charging," Small, vol. 18, pp. 2105833 (1 of 10), (Jan. 21, 2022).
Han Et L., "Single- or Poly-Crystalline Ni-Rich Layered Cathode, Sulfide or Halide Solid Electrolyte: Which Will be the Winners for All-Solid-State Batteries?," Advanced Energy Materials, vol. 11, pp. 2100126 (1 of 15), (Apr. 17, 2021).
Zhu et al., "Atomic-Level Understanding of Surface Reconstruction Based on Li[NixMnyCo1-x-y]O2 Single-Crystal Studies," ACS Applied Energy Materials, vol. 3, pp. 4799-4811, (Apr. 30, 2020).
Zhu et al., "Single-crystal based studies for correlating the properties and high-voltage performance of Li [NixMnyCo1-x-y]O2 cathodes†," Journal of Material Chemistry A, vol. 7, pp. 5463-5474, (Feb. 4, 2019).
Liu et al., "Electrochemo-Mechanical Effects on Structural Integrity of Ni-Rich Cathodes with Different Microstructures in All Solid-State Batteries," Advanced Energy Materials, vol. 11, No. 8, pp. 2003583 (1 of 11), (Feb. 24, 2021).
Ryu et al., "Capacity Fading Mechanisms in Ni-Rich Single-Crystal NCM Cathodes," ACS Energy Letters, vol. 6, No. 8, pp. 2726-2734, (Jul. 13, 2021).
Zhang et al., "Surface regulation enables high stability of single-crystal lithium-ion cathodes at high voltage," Nature Communications, vol. 11, pp. 1-11, (Jun. 16, 2020).
Conforto et al., "Editors' Choice—Quantification of the Impact of Chemo-Mechanical Degradation on the Performance and Cycling Stability of NCM-Based Cathodes in Solid-State Li-Ion Batteries," Journal of the Electro Chemical Society, vol. 168, pp. 070546, (Jul. 21, 2021).
Wang et al., "Single crystal cathodes enabling high-performance all-solid-state lithium-ion batteries," Energy Storage Materials, vol. 30, pp. 98-103, (Sep. 2020).
Payandeh et al., "Single versus poly-crystalline layered oxide cathode materials for solid-state battery applications—a short review article," vol. 31, pp. 100877 (1 of 9), (Feb. 2022).

* cited by examiner

PC-NMC811

SC-NMC811

HIGH-ENERGY AND HIGH POWER COMPOSITE CATHODES FOR ALL SOLID-STATE BATTERIES

RELATED APPLICATIONS

This application is a continuation-in-part of U.S. patent application Ser. No. 17/834,076, filed Jun. 7, 2022, which claims priority to U.S. Provisional Patent Application No. 63/210,335, filed Jun. 14, 2021, and to U.S. Provisional Patent Application No. 63/277,722, filed Nov. 10, 2021, all of which are herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to all solid-state batteries and more particularly to composite cathodes for all solid-state batteries.

BACKGROUND

Rapid climate change and an increase in pollution have spurred the electrification of transportation and development of high-density energy storage systems. Along with this demand, the electric vehicle (EV) market has grown with lithium-ion battery (LIB) use due to their high energy and power density, better safety, and longer lifespan. Although LIBs have been developed to power EVs to fulfill the needs of long drive range (≥500 km), the presence of organic liquid electrolytes in traditional LIBs have caused serious safety issues due to their flammability, subjecting the batteries to thermal runaway.

In this regard, all-solid-state batteries (ASSBs) comprising a 4 V-class cathode materials (CAM), a solid electrolyte (SE), and a lithium metal (or its alloy) anode, have been promoted as the future of energy storage system due to their comparable energy density and better safety compared to the conventional lithium-ion batteries a using liquid electrolyte. However, a number of challenges of SEs associated with electrochemical and chemomechanical stabilities hinder the current development of high energy ASSBs with long cycle life.

For example, oxide solid electrolytes, such as perovskite-, garnet-, and sodium/lithium superionic conductor (NASICON/LiSICON)-type SEs have been explored due to their high lithium ion conductivity ($10^{-4}$~$10^{-3}$ S·cm$^{-1}$) and electrochemical stability window up to ~4.3 V (V vs. $Li^+$/Li). Although the oxide solid electrolytes provide high enough ionic conductivity to cycle ASSBs, high-temperature sintering processes that are essential to achieve good contact between the SE and CAM can cause chemical reactions between the materials and degrade the ASSB performance.

In case of sulfide SEs, such as glass-, glass-ceramic-, and argyrodite-, they can perform $10^{-2}$~$10^{-3}$ S·cm$^{-1}$ class high ionic conductivity and good ductility which enables to establish intimate contact to CAMs. However, sulfide SEs exhibit poor electrochemical stability and decompose at ~2.6 V upon charging ASSBs. Therefore, electronically insulating coating, such as $LiNbO_3$, $LiNb_{0.5}Ta_{0.5}O_3$, on CAMs is required to mitigate sulfide oxidation and cycle the ASSBs.

SUMMARY

All-solid-state batteries (ASSBs) comprising a 4 V-class layered oxide cathode active material (CAM), an inorganic solid-state electrolyte (SE), and a lithium metal anode are considered the future of energy storage technologies. To date, aside from the known dendrite issues at the anode, cathode instability due to oxidative degradation of SE, reactivities between SE and uncoated CAM, and loss of mechanical integrity present significant barriers in ASSB development. As described herein, we address these challenges with composite cathodes that include the following features: (1) a halide SE with high oxidative stability to enable direct use of uncoated 4 V-class CAM; and (2) single-crystal (SC) CAM to eliminate intergranular cracking associated with volume changes and to facilitate Li transport. We report the performance achieved on such ASSB cell design incorporating an uncoated SC-$LiNi_{0.8}Co_{0.1}Mn_{0.1}Mn_{0.1}O_2$ (NMC811) CAM, a $Li_3YCl_6$ (LYC) SE, and a Li—In alloy anode, which delivers a capacity retention of nearly 90% after 1000 cycles at C/2 rate. Through comparative studies of polycrystalline and SC-NMC811 composite cathodes, we reveal the working mechanisms that enable such stable cycling in the latter cell.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 1A—PC-NMC811; FIG. 1B—SC-NMC811; and FIG. 1C—LYC solid electrolyte. FIG. 1D—pristine PC-NMC811 and SC-NMC811 powder; and FIG. 1E—as-prepared LYC SE and ICDD no. 00-044-0286 (space group P$\bar{3}$m1). FIG. 1G shows a magnified image at the cathode interface. FIG. 1H shows a magnified image at the anode interface.

FIGS. 2B and 2D show charge/discharge profiles. FIGS. 2C and 2E show discharge capacity retention and coulomb efficiency. FIGS. 2B and 2C were collected from the cell without carbon. FIGS. 2D and 2E were collected from the cell with 2.5 wt % carbon.

FIG. 3C shows capacity retention plots for the cells cycled at 0.5 C for 200 cycles followed by 3 cycles at 0.2 C. The same sequence repeats throughout the tests. FIG. 3D shows rate capability comparison of PC-NMC811 and SC-NMC811 ASSB cells. Performance variation in FIG. 3C is a result of laboratory ambient temperature fluctuation during the test.

FIGS. 4A-4D were collected from PC-NMC811 and FIGS. 4E and 4F were collected from SC-NMC811. The vertical lines in FIGS. 4B, 4D, 4F, and 4H are imaging artifacts from FIB processing.

DETAILED DESCRIPTION

Figures 1A, 1B, 1C:
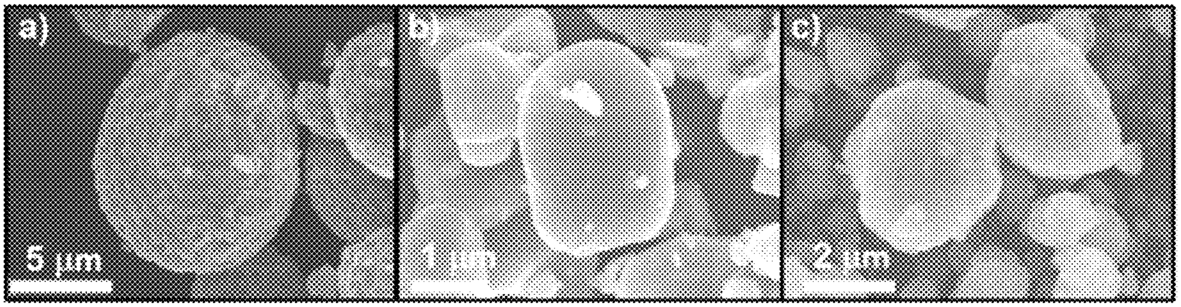
FIGS. 1A-1C show SEM image of pristine powders.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Recently, lithium metal halide solid electrolytes (HSEs) with a general formula of $Li_3MCl_6$ (M=Sc, In, Y, Er, and Yb) were found to exhibit a high ionic conductivity (>0.1 $mS \cdot cm^{-1}$ at room temperature), a wide electrochemical stability window (up to 4.5 V vs. $Li^+/Li$) and ductility that enable them to be used with 4 V class CAM without coating treatment. New HSEs are being explored by a number of research groups. For example, one research group recently discovered $Li_2In_{1/3}Sc_{1/3}Cl_4$, which has a high conductivity of 2 $mS \cdot cm^{-1}$. Its excellent oxidative stability enabled stable cycling of ASSB cells with a $LiCoO_2$ or $LiNi_{0.85}Mn_{0.05}Co_{0.1}O_2$ cathode. The work also demonstrated the stable interface between the CAM and HSE and the absence of side reaction products at the cathode interface.

As increasing Ni content for higher capacity induces more uneven stress build-up within the anisotropic structure, high Ni-rich NMC cathodes usually showed lower capacity retention than low Ni containing NMC materials (e.g., $LiNi_{0.6}Mn_{0.2}Co_{0.2}O_2$) in ASSBs. Furthermore, conventional poly-crystal (PC) $LiNi_{0.8}Mn_{0.1}Co_{0.1}O_2$ (PC-NMC811) are large spherical secondary particles made up of sub-micron primary grains with random orientations. This causes prolonged $Li^+$ diffusion pathways and nonuniform Li concentration inside the particles, leading to stress and strain and eventual internal cracking along the grain boundaries. In liquid cells, electrolyte permeates into the pores and along the loose grain boundaries to enable the utilization of isolated CAM. In ASSBs, however, cracking and volume change can lead to void formation, contact loss, impedance rise and capacity fade. Single-crystal (SC) $LiNi_{0.8}Mn_{0.1}Co_{0.1}O_2$ (SC-NMC811) are attractive alternatives as they eliminate intergranular cracking due to the absence of grain boundaries and allow for particle-level surface optimization for fast Li diffusion.

Figure 6:
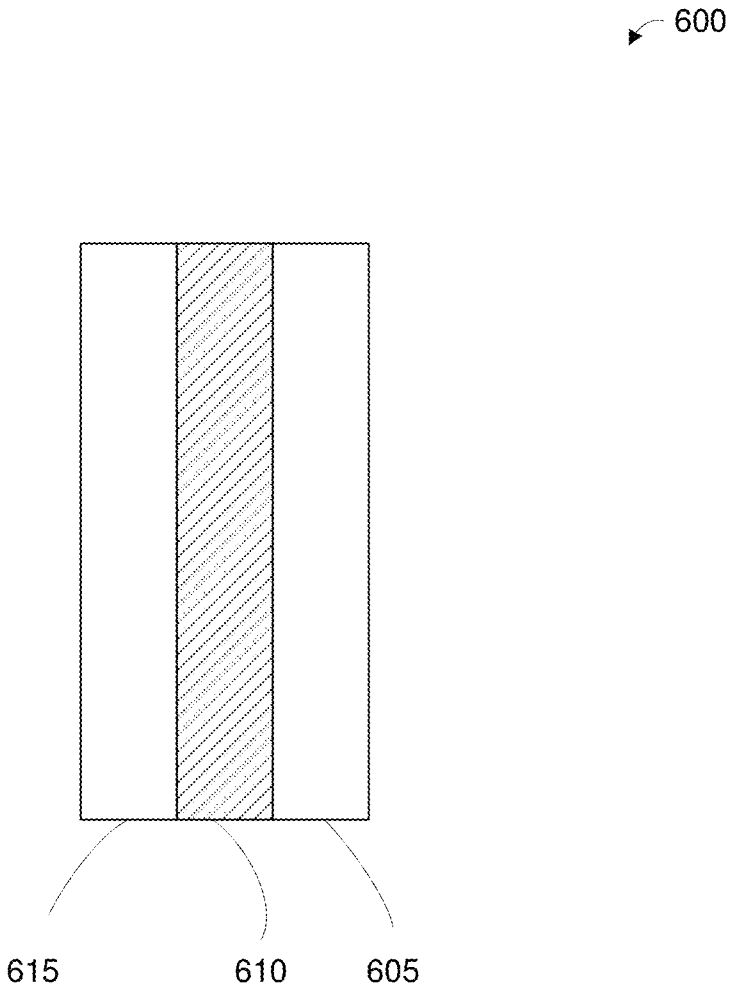
FIG. 6 shows an example of a schematic illustration of an all solid-state battery.

FIG. 6 shows an example of a schematic illustration of an all solid-state battery. As shown in FIG. 6, an all solid-state battery 600 includes a composite cathode 605, a separator 610, and an anode 615.

The composite cathode 605 comprises $LiNi_xMn_yCo_{1-x-y}O_2$, x≥0.33, with the $LiNi_xMn_yCo_{1-x-y}O_2$ being embedded in a matrix of a first lithium metal halide solid electrolyte comprising $Li_{6-3a}M_aX_6$, 0<a<2. About 80% or more of the $LiNi_xMn_yCo_{1-x-y}O_2$ comprises single crystals of $LiNi_xMn_yCo_{1-x-y}O_2$. M is an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof. X is a halide from a group of chlorine (Cl), bromine (Br), iodine (I), and combinations thereof.

The separator 610 comprises a second lithium metal halide solid electrolyte comprising $Li_{6-3b}N_bZ_6$, 0<b<2. N is an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof. Z is a halide from a group of chlorine (Cl), bromine (Br), iodine (I), and combinations thereof.

In some embodiments, about 95% or more of the $LiNi_xMn_yCo_{1-x-y}O_2$ comprises single crystals of $LiNi_xMn_yCo_{1-x-y}O_2$. In some embodiments, about 90% or more of each of the single crystals of $LiNi_xMn_yCo_{1-x-y}O_2$ are polyhedron-shaped particles with (104)-family surfaces. In some embodiments, about 95% or more of each of the single crystals of $LiNi_xMn_yCo_{1-x-y}O_2$ are polyhedron-shaped particles with (104)-family surfaces.

In some embodiments, about 95% or more of the $LiNi_xMn_yCo_{1-x-y}O_2$ comprises single crystals of $LiNi_xMn_yCo_{1-x-y}O_2$. In some embodiments, about 90% or more of each of the single crystals of $LiNi_xMn_yCo_{1-x-y}O_2$ are octahedron-shaped particles with (012)-family surfaces. In some embodiments, about 95% or more of each of the single crystals of $LiNi_xMn_yCo_{1-x-y}O_2$ are octahedron-shaped particles with (012)-family surfaces.

In some embodiments, the composite cathode comprises $LiNi_xMn_yCo_{1-x-y}O_2$, x≥0.8. In some embodiments, the single crystals of the $LiNi_xMn_yCo_{1-x-y}O_2$ are $LiNi_{0.8}Co_{0.1}Mn_{0.1}O_2$.

In some embodiments, each of the single crystals of $LiNi_xMn_yCo_{1-x-y}O_2$ has a size of about 30 nanometers (nm) to 10 microns. In some embodiments, each of the single crystals of $LiNi_xMn_yCo_{1-x-y}O_2$ has a size of about 3 microns to 5 microns.

In some embodiments, a weight percentage of the $LiNi_xMn_yCo_{1-x-y}O_2$ in the composite cathode is about 50% to 90%, and a weight percentage of the first lithium metal halide solid electrolyte in the composite cathode is about 10% to 50%.

In some embodiments, the composite cathode further comprises carbon. In some embodiments, a weight percentage of carbon in the composite cathode is about 0.1% to 5%. In some embodiments, the carbon in the composite cathode comprises particles having a size of about 5 nm to 50 microns. In some embodiments, a weight percentage of the $LiNi_xMn_yCo_{1-x-y}O_2$ in the composite cathode is about 57%, a weight percentage of the first lithium metal halide solid electrolyte in the composite cathode is about 40.5%, and a weight percentage of the carbon in the composite cathode is about 2.5%.

In some embodiments, particles of the first lithium metal halide solid electrolyte have a size of about 30 nm to 10 microns. In some embodiments, the first lithium metal halide solid electrolyte and the second lithium metal halide solid electrolyte have different compositions. In some embodiments, the first lithium metal halide solid electrolyte and the second lithium metal halide solid electrolyte have the same composition. In some embodiments, the first lithium metal halide solid electrolyte comprises comprise $Li_3YCl_6$, and the second lithium metal halide solid electrolyte comprises $Li_3YCl_6$.

In some embodiments, the anode comprises Li metal. In some embodiments, the anode comprises a LiA alloy, and A is an element from a group of Mg, Si, In, and Sn. In some embodiments, the anode comprises a LiIn alloy. In some embodiments, the anode comprises a LiIn alloy having a Li:In molar ratio of about 1:99 to 50:50. In some embodiments, the anode comprises a LiIn alloy having a Li:In molar ratio of about 3:7.

EXAMPLE

The following examples are intended to be examples of the embodiments disclosed herein, and are not intended to be limiting.

As described herein, we combined the HSE and SC-NMC in a composite cathode to take advantage of oxidative stability of HSE and mechanical stability of SC particles. The concept was demonstrated on ASSB cells with a SC-NMC811 CAM, LYC electrolyte and a Li—In alloy anode. A high discharge capacity of 170 mAh/g at 0.2 C and 140 mAh/g at 0.5 C was achieved, along with excellent discharge capacity retention of ~90% after 1000 cycles. The cell drastically outperformed the equivalent cell but with a PC-NMC CAM counterpart. We further compared the degradation mechanisms in PC- and SC-NMC811 CAM cells, revealing the detrimental effect of particle cracking in the former while the latter maintained the integrity and intimate contact with LYC particles.

Example—Synthesis and Properties

Figure 1E:
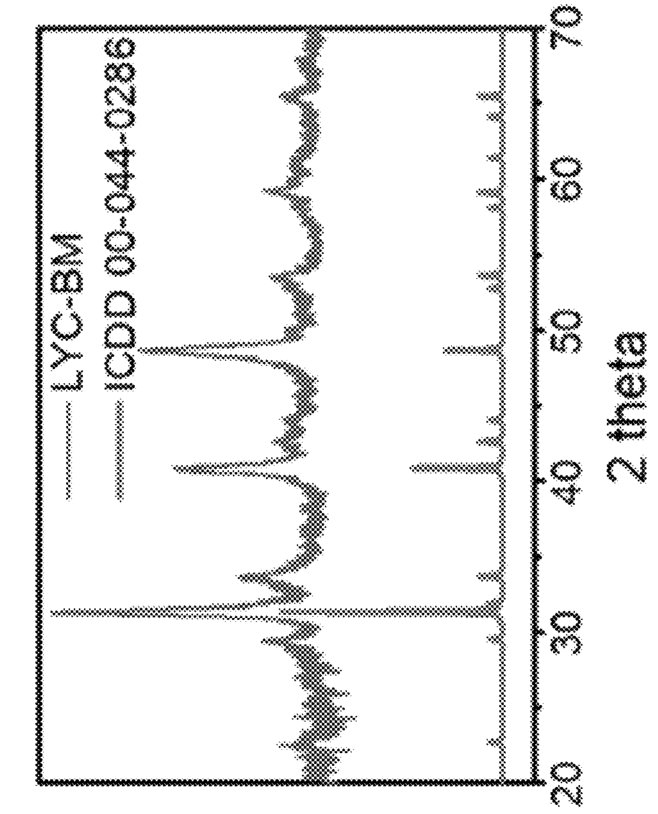
FIGS. 1D and 1E show X-ray diffraction patterns.
Figure 1D:
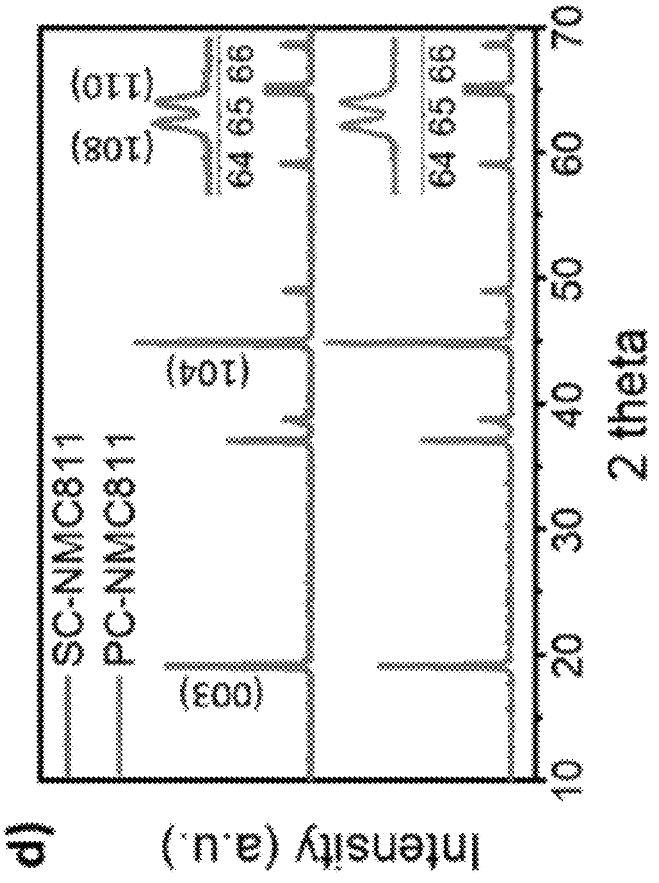

FIG. 1A-1C show the scanning electron microscope (SEM) images of as-prepared PC-NMC811, SC-NMC811, and LYC particles used for ASSB cells. The PC-NMC811 (FIG. 1A) shows the spherical shape of secondary particles (8~10 μm) that comprise ~0.5 μm sized primary particles. The SC-NMC811 (FIG. 1B) is composed of 3-5 μm sized primary particles without a specific particle shape. The collected powder XRD patterns from the PC- and SC-NMC811 samples (FIG. 1D) show that both samples are well crystalized in the layered structure ($R\bar{3}m$) with a d-spacing of ~4.62 Å, evidenced by the clear peak splitting of the (110) and (108) reflections at similar intensity ratio. FIG. 1C shows the SEM image of as-prepared LYC particles synthesized by a high-energy ball-milling method. The LYC particles exhibit various shapes and particle sizes due to the nature of the ball-milling process. The XRD patterns of synthesized LYC (FIG. 1E) confirms the hexagonal closed-packed (hcp) crystal structure ($P\bar{3}m1$) with a relatively low crystallinity. The synthesized LYC exhibits a high ionic conductivity of ~0.32 $mS{\cdot}cm^1$, in accordance with the previous reports on cation-disordered LYC samples prepared by ball-milling process.

Figures 1F, 1G, 1H:
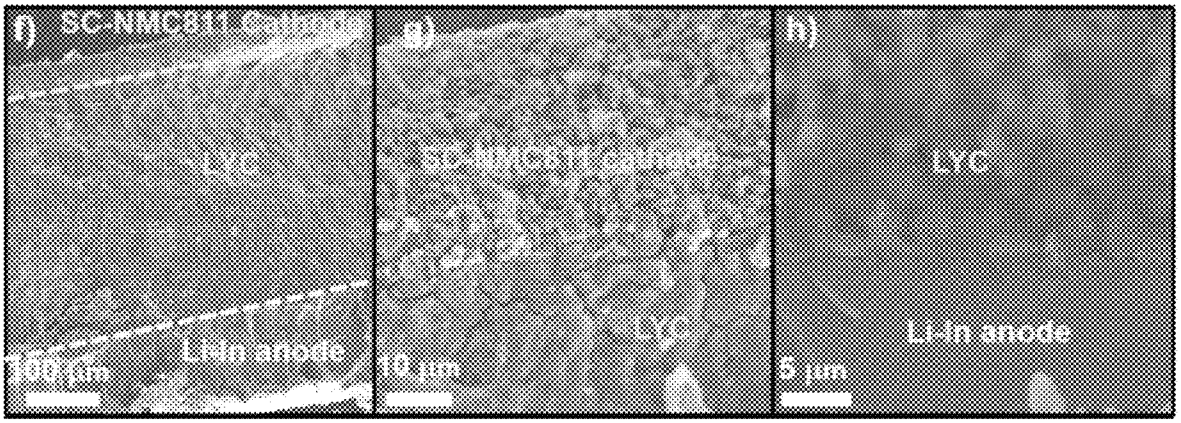
FIGS. 1F-1H show cross-sectional SEM image of as-prepared ASSB cell assembly including a SC-NMC811 composite cathode and a Li—In anode (FIG. 1F).

ASSB cells were assembled by using a layer-by-layer approach. LYC was first pelletized under an external pressure of ~100 Mpa. The resulting pellets achieved a density of ~85%, which is similar to what was obtained on other soft SEs such as sulfides. Cathode mixtures of NMC811 and LYC were then pelletized on top of the prepared LYC pellet to serve as a working electrode. For anode fabrication, an In metal disk was placed on the LYC pellet before placing a Li metal disk on the In metal disk, a procedure described in S. Y. Kim, K. Kaup, K.-H. Park, A. Assoud, L. Zhou, J. Liu, X. Wu and L. F. Nazar, ACS Materials Letters, 2021, 3, 930-938, which is herein incorporated by reference. This enables intimate contact of LYC and In metal after pressing the cell, providing high Li ion diffusivity without the direct contact between LYC and Li metal, which has been shown to induce LYC reduction. Li and In subsequently form a Li—In (3:7 molar ratio) alloy anode upon cell cycling. FIGS. 1F-1H show the cross-sectional SEM images of the assembled ASSB cell with an SC-NMC811 composite cathode and a Li—In anode. Intimate contact to the LYC SE layer was obtained at both the densified SC-NMC811 composite cathode layer and the metallic anode layer.

Example—Electrochemical Performance

Figure 2A:
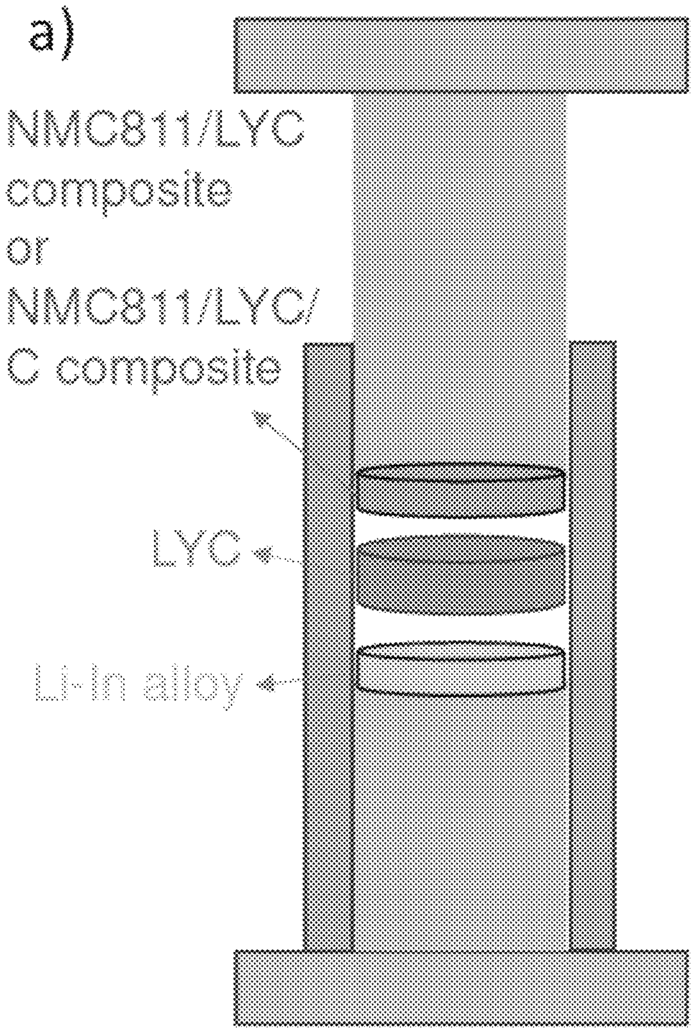
FIG. 2A shows a schematic of an ASSB cell configuration.
Figure 2B:
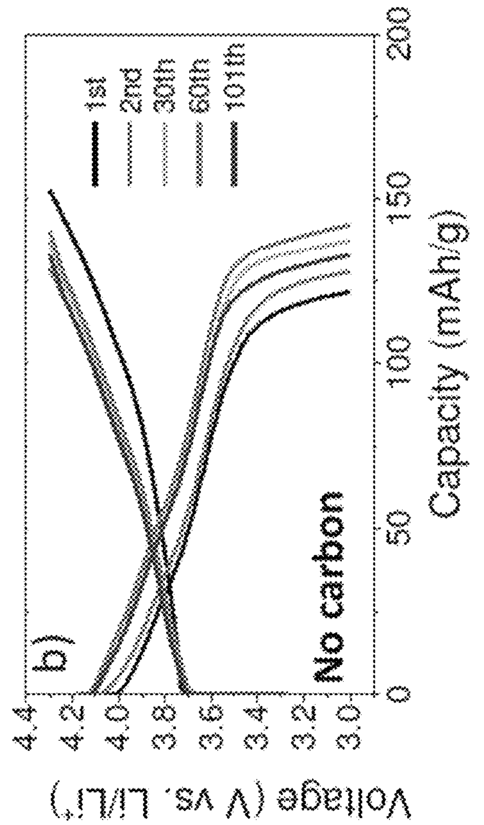
FIGS. 2B-2E show SC-NMC811 ASSB cell performance with and without a carbon additive in the composite cathode.
Figure 2C:
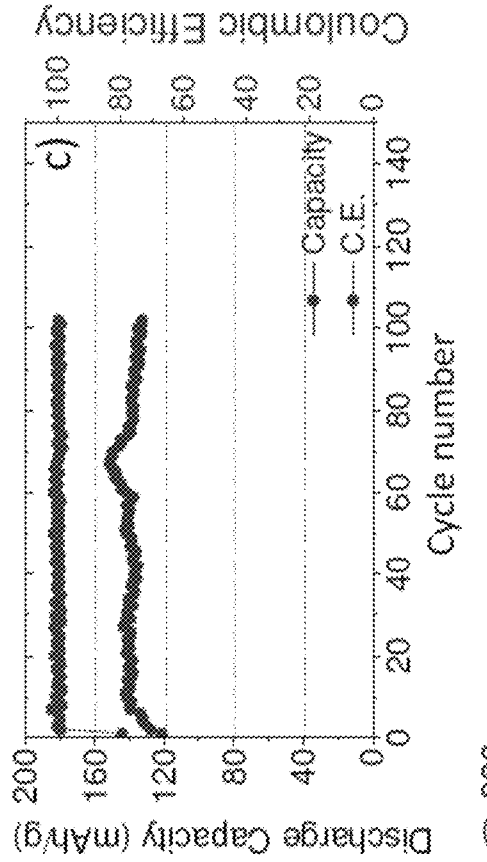
Figure 2D:
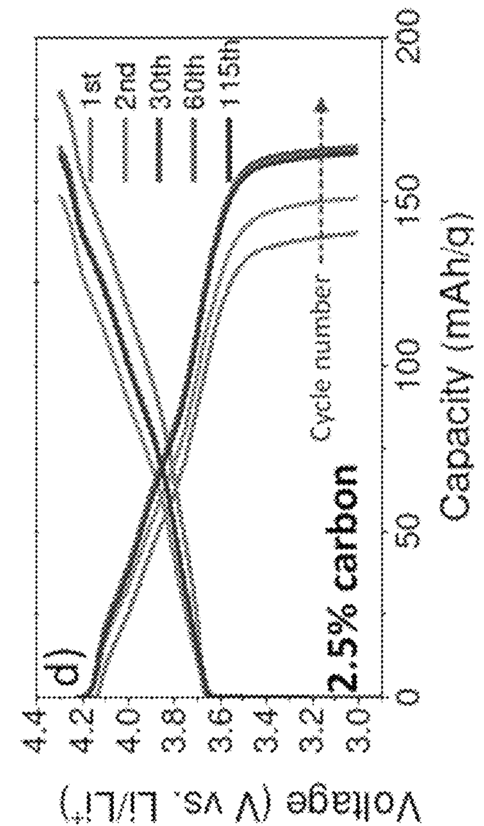
Figure 2E:
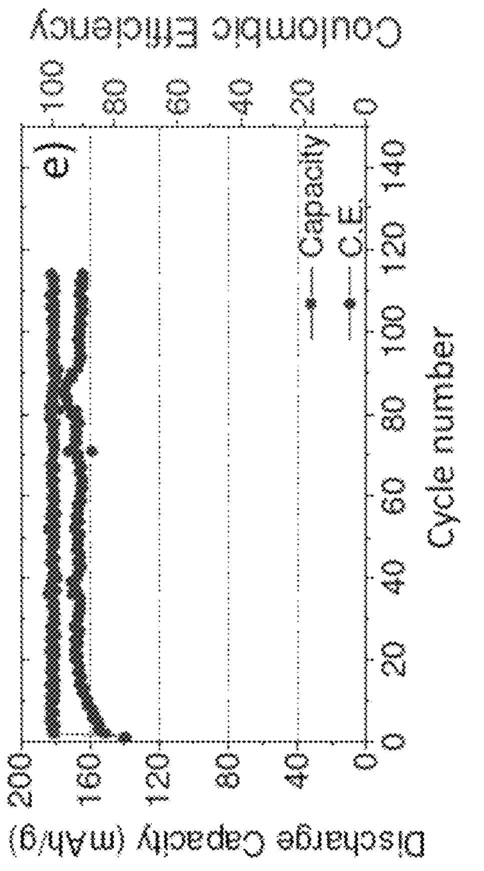

FIG. 2A shows a schematic of the cell configuration used for electrochemical evaluation at room temperature. A constant pressure of ~8 Mpa was applied externally during all cell testing, similar to the conditions used for other ASSB cells utilizing soft SEs such as sulfides. In the case with a sulfide SE, it is known that adding carbon additives to the composite cathode can compensate the low electric conductivity and improve the initial capacity. However, it was also found that long-term cycling performance deteriorates as carbon induces SE decomposition. With the high oxidation stability of halide SEs, carbon may be introduced as a conducting agent without the negative effect on SE decomposition.

The effect of conductive carbon was evaluated by comparing the performance of ASSB cells of SC-NMC811 composite cathodes with and without 2.5 wt. % carbon black, in a SC-NMC811/LYC/C weight ratio of 57:40.5:2.5 and 60:40:0, respectively. Due to the electronically insulating nature of LYC, negligible capacity was obtained from the cell with the 60:40:0 composite, which has a similar SC-NMC811/LYC ratio as the carbon-containing composite. This result is consistent with previous reports on poor performance of cathode composites when including a high fraction of halide SE. Upon reducing the LYC content, good performance was obtained with a SC-NMC811/LYC/ratio of 80:20. FIGS. 2B and 2C and FIGS. 2D and 2E show the electrochemical performance of cathodes with a ratio of 57:40.5:2.5 and 80:20:0, respectively. Both cells experienced capacity increase with cycling, indicating a "break-in" process where solid-state conduction pathways were being established. In the presence of carbon, the cell delivered a discharge capacity of ~170 mAh/g after 100 cycles at C/5 rate, similar to what was obtained in the equivalent cell using a liquid electrolyte. On the other hand, the cell without carbon only delivered ~140 mAh/g after 100 cycles, about 18% reduction in capacity. Capacity retention was also improved, achieving ~117% and 107% after 100 cycles, for the cells with and without carbon, respectively. It is clear that carbon plays a role in facilitating electronic conduction within the cathode composite. To this end, cathodes containing 2.5 wt. % of carbon were used for the rest of the study.

Figure 3A:
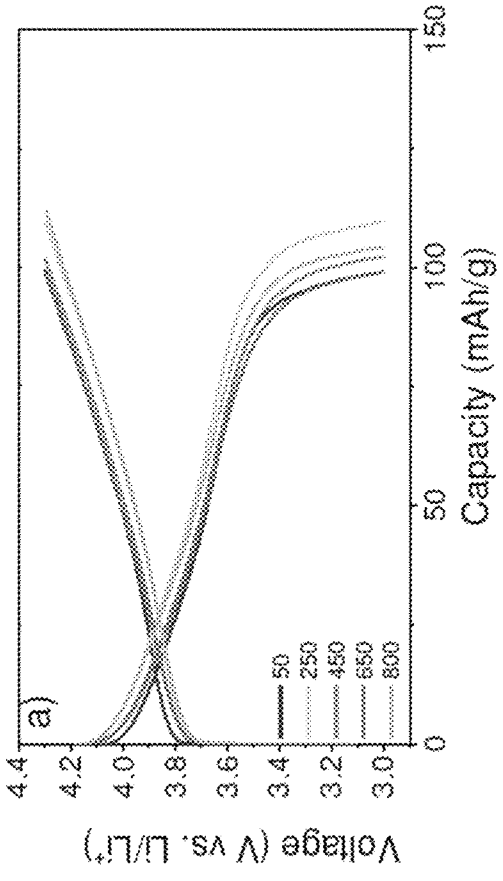
FIGS. 3A-3D show charge/discharge profiles of (FIG. 3A) PC-NMC811 and (FIG. 3B) SC-NMC811 ASSB cells.
Figure 3B:
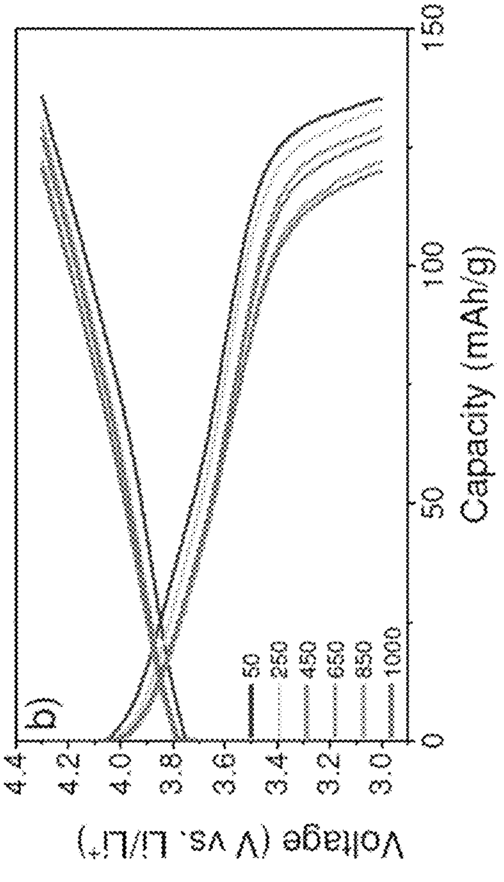
Figure 3C:
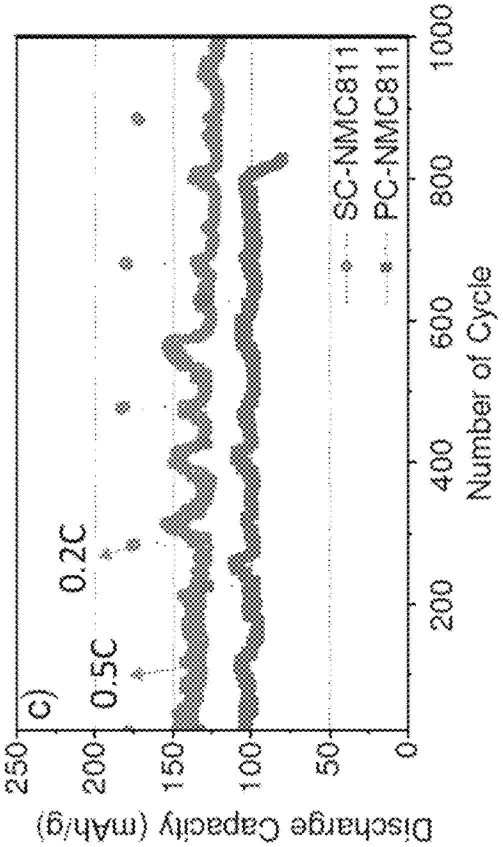

FIGS. 3A-3D compare the long-term cycling of ASSB cells with a PC- or SC-NMC811 composite cathode, carried out by galvanostatic cycling at C/2 in the voltage window of 3-4.3 V (V vs. $Li^+$/Li). The cells were cycled at room temperature at C/2 for the first 200 cycles and then followed by 3 cycles at C/5. This sequence was repeated throughout the testing. Both PC- and SC-NMC811 ASSB cells displayed the typical voltage profiles of NMC811 (FIGS. 3A and 3B), with slightly lower polarization observed in the SC-NMC811 cell. At the C/2 rate, the initial discharge capacities were ~100 and 140 mAh/g for PC- and SC-NMC811 ASSB cells, respectively, which decreased to ~80 mAh/g after 850 cycles and ~125 mAh/g after 1000 cycles. This corresponds to a capacity retention of ~80% and 89%, respectively (FIG. 3C). It is worth noting that the PC-NMC811 cell had a capacity retention of ~70% after 820 cycles, after which it experienced a much faster capacity decay.

We wish to point out that our SC-NMC811 cell delivered one of the best performance reported on ASSB cells using an NMC811 cathode so far. The long-term cycling stability is better than in previous studies carried out using a highly conducting sulfide SE (~3 $mS\cdot cm^{1}$) along with a coated Ni-rich NMC cathode, which achieved ~85% capacity retention after 1000 cycles. The impact of SE conductivity increase (by an order of magnitude) is significant in cell performance. As shown by one research group, ASSB cell performance can be further improved by using halide SEs with a higher ionic conductivity. In their study, $Li_2In_xSc_{0.666-x}Cl_4$ with an ionic conductivity up to 2.0 $mS\cdot cm^{-1}$was discovered, which enabled stable cycling of a $LiNi_{0.85}Mn_{0.05}Co_{0.1}O_2$ cell with ~80% capacity retention after 3000 cycles. (L. Zhou, T.-T. Zuo, C. Y. Kwok, S. Y. Kim, A. Assoud, Q. Zhang, J. Janek and L. F. Nazar, *Nature Energy,* 2022, 1-11). Considering the outstanding performance achieved on LYC cells, we believe that when coupled with advanced halide SEs, our SC-NMC composite cathode design principle can lead to further improvement in ASSB performance. We are conducting similar studies using halide SEs with a higher conductivity.

Figure 3D:
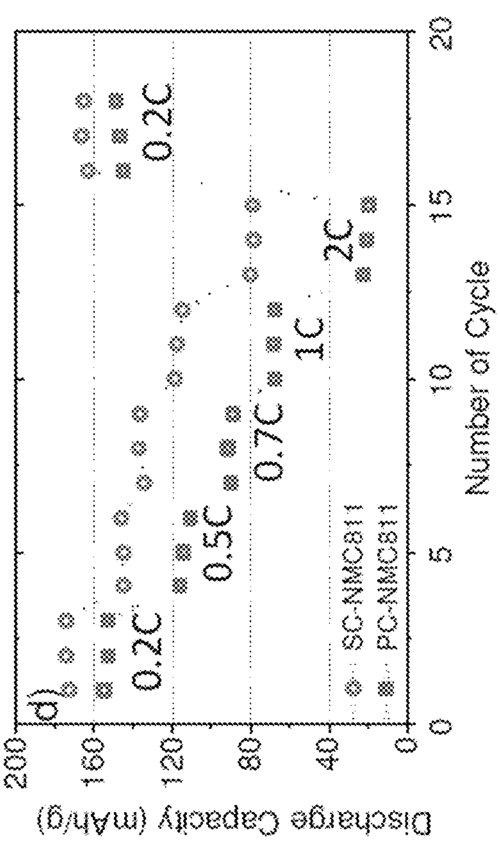

FIG. 3D compares the rate capability of the PC- and SC-NMC811 ASSB cells, evaluated by gradually increasing the charge and discharge rate from 0.2 C, 0.5 C, 0.7 C, 1 C to 2 C, followed by 0.2 C cycling. Compared to the equivalent liquid cells, both ASSB cells showed relatively poor kinetics, corresponding to the more resistive Li transport in the solid state. However, the SC-NMC811 cell consistently outperformed the PC counterpart at every rate, suggesting kinetic enhancement in the SC cell design.

Example—Understanding Performance Improvement in SC-NMC Cell

Post-mortem analyses were carried out to understand capacity fade mechanisms in the ASSB cells. In comparison with the pristine composite cathode, several observations were made on the cycled PC-NMC811 composite cathode, including contact loss between PC-NMC811 and LYC solid electrolyte, internal cracking within the PC-NMC811 secondary particles and loss of connections in $Li^+$ pathways, and the presence of isolated and inaccessible PC-NMC811 primary particles after cycling. In contrast, no discernible changes were observed in comparing the pristine and the cycled SC-NMC811 composites. The SC-NMC811 particles maintained their integrity even after 1000 cycles.

Figures 4A, 4B, 4C, 4D:
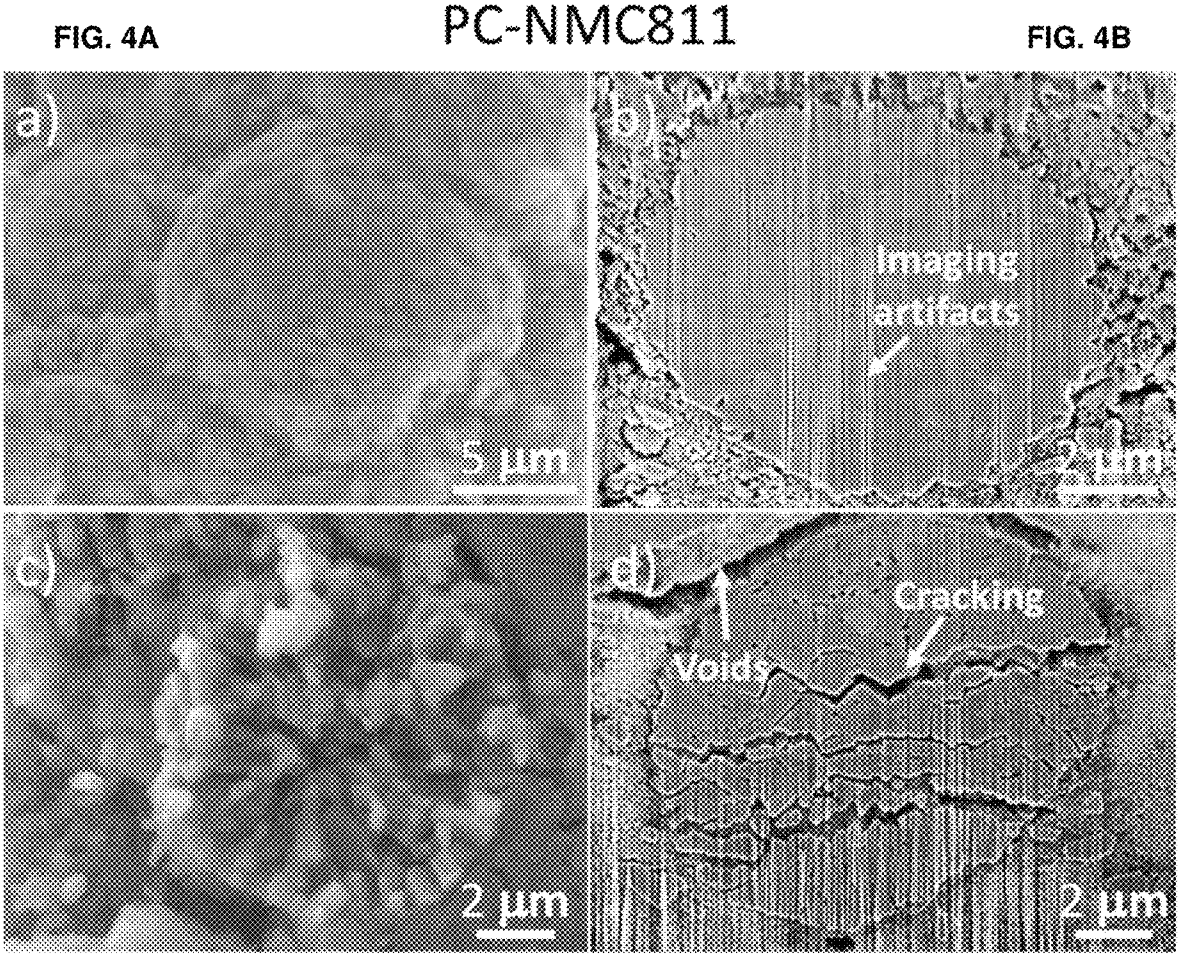
FIGS. 4A-4H show SEM images (FIGS. 4A, 4C, 4E, and 4D) and cross-sectional FIB-SEM images (FIGS. 4B, 4D, 4F, and 4H) collected from as-prepared (FIGS. 4A, 4B, 4E, and 4F) and cycled (FIGS. 4C, 4D, 4G, and 4H) NMC811.
Figures 4E, 4F, 4G, 4H:
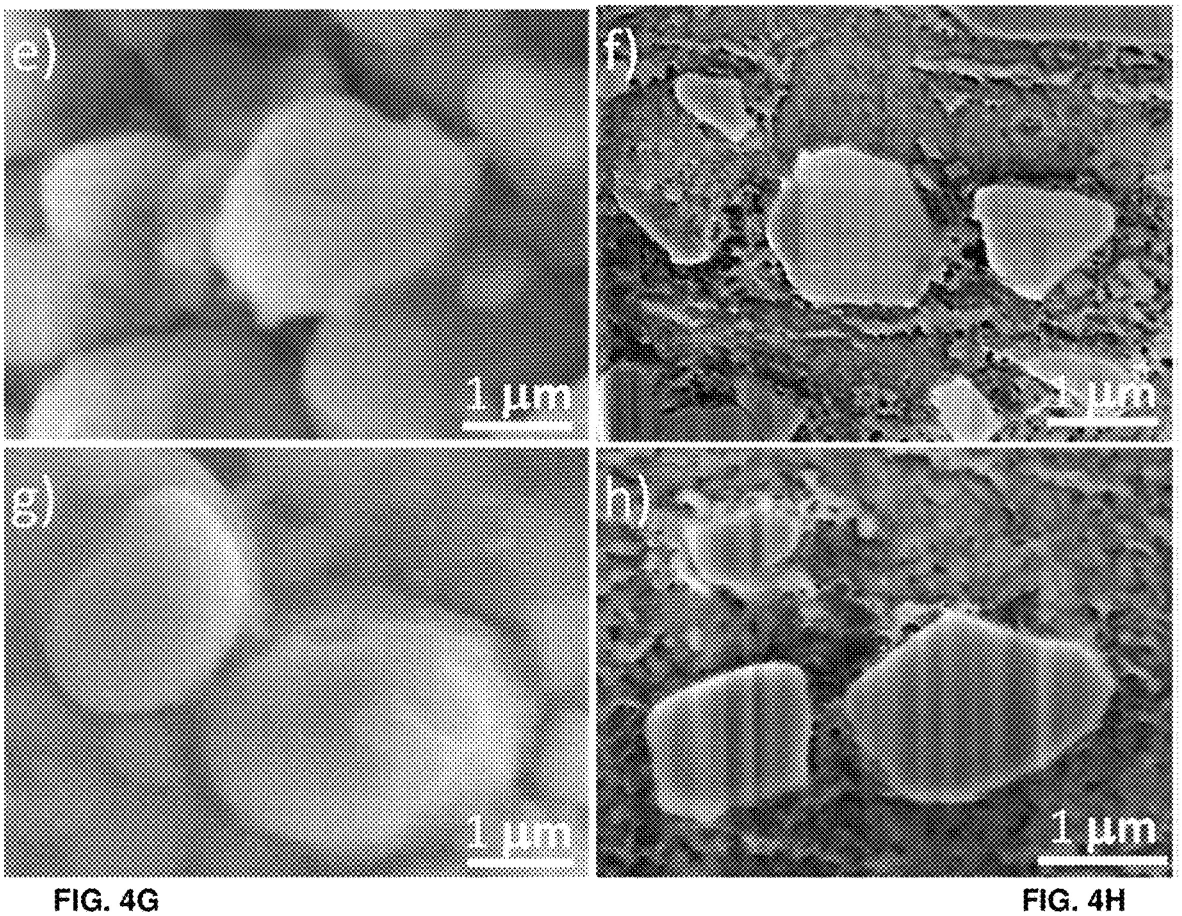

We further examined the internal particle structure by using focused ion beam scanning electron microscope (FIB-SEM) imaging. FIGS. 4A and 4B show the top and the cross-sectional views of a representative pristine PC-NMC811 particle, respectively, which reveal dense agglomerates consisting of primary particles with ~500 nm in size. After the long-term cycling (850 cycles), many internal and external cracks appeared in the secondary particle (FIGS. 4C and 4D), resulting in partial disconnection of Li ion diffusion pathways as well as contact loss with the LYC SE. This is consistent with the reported effects of anisotropic volume change experienced by PC-NMC811 particles during cycling. In comparison, FIB-SEM images of SC-NMC811 show crack-free particles before (FIGS. 4E and 4F) and after long-term cycling (FIGS. 4G and 4H, 1000 cycles). The contact between the SC-NMC811 and LYC SE remain nearly unchanged, enabling efficient $Li^+$ ion migration during cycling. The two scenarios provide marked contrast in terms of the effect of cycling, with the former suffering significant loss of active materials due to isolation and inaccessibility. The results are consistent with the performance differences observed on the two cells.

Figure 5A:
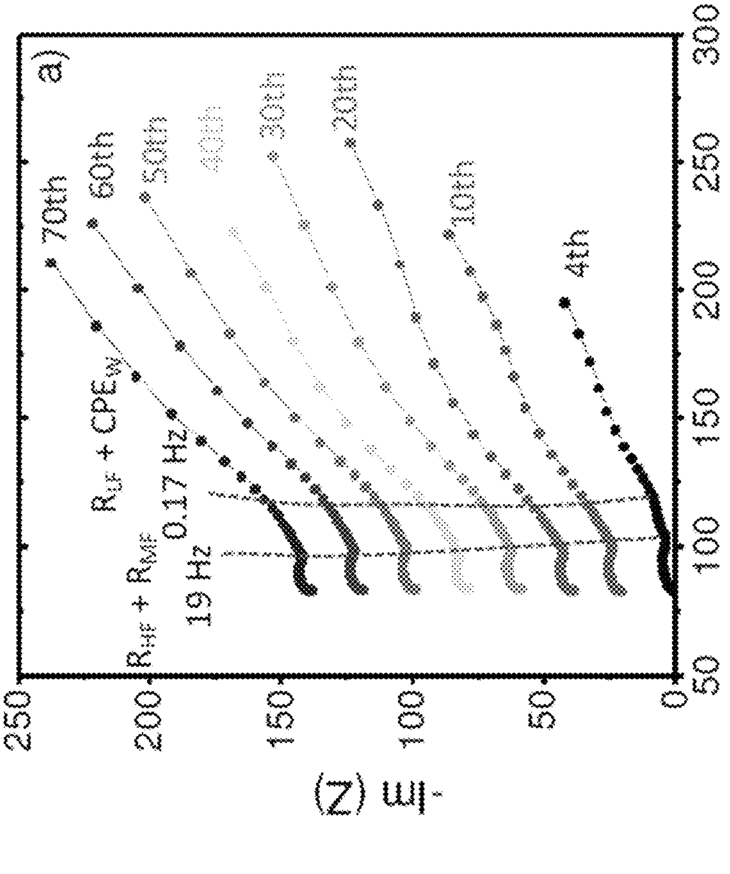
FIGS. 5A and 5B show Nyquist plots obtained at 3.67 V during discharge of (FIG. 5A) PC-NMC811 and (FIG. 5B) SC-NMC811 ASSB cells at the indicated cycle number.
Figure 5B:
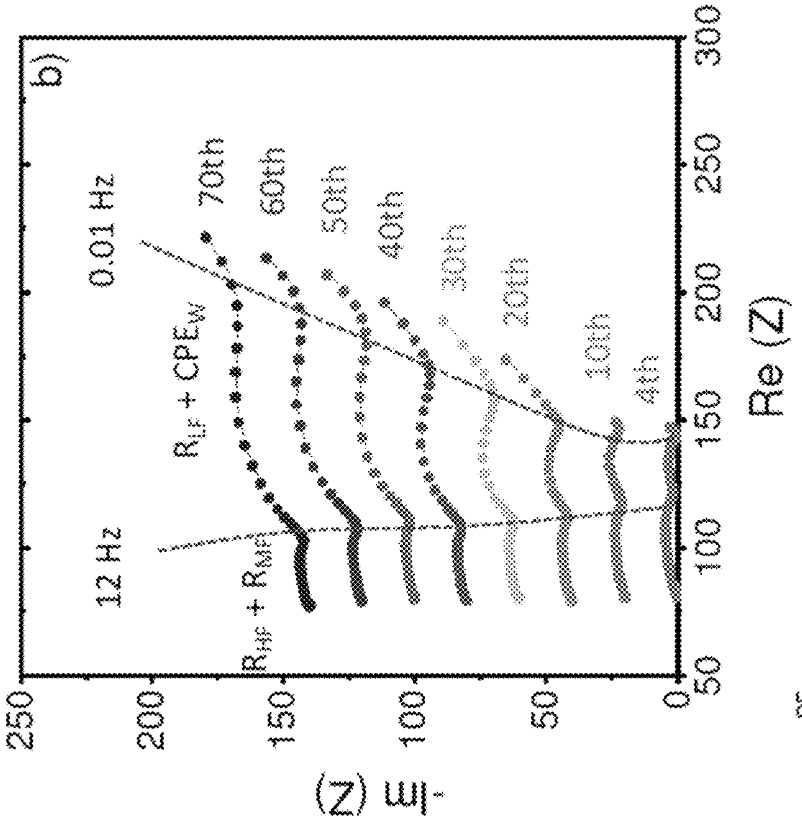
Figure 5C:
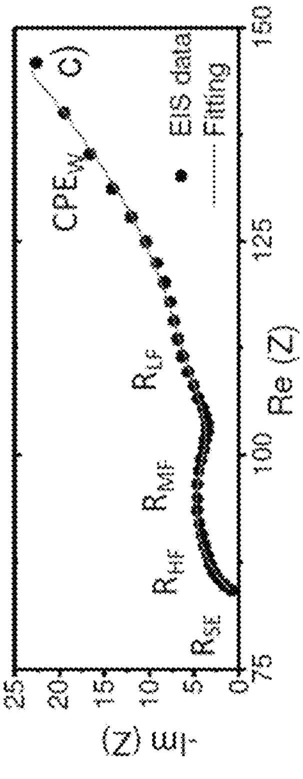
FIGS. 5C and 5D show fitting of the Nyquist plots collected at 3.67 V during the 4th discharge of PC-NMC811 and SC-NMC811 ASSB cells, respectively. The inset in FIG. 5D shows the equivalent circuit used for the fitting. $R_{SE}$ indicates impedance from bulk SE; $R_{HF}$ indicates impedance from grain boundary of bulk SE; $R_{MF}$ indicates impedance from the CAM and SE interface; $R_{LF}$ indicates impedance from the Li—In anode and SE interface; CPEw is a constant phase element which indicates impedance from $Li^+$ diffusion in CAM (Warburg region).
Figure 5D:
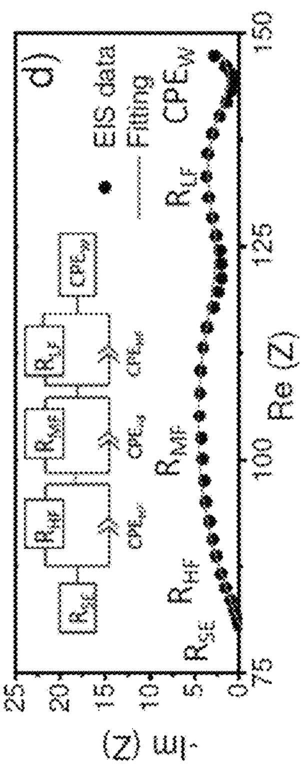

Further analysis of cycling-induced changes was carried out by using electrochemical impedance spectroscopy (EIS). When cycled at 0.2 C for 120 cycles, the SC-NMC811 cell showed stable capacity retention while the PC-NMC811 cell experienced gradual capacity decay, consistent with the previous cycling results. FIGS. 5A and 5B show the Nyquist plots obtained at 3.67 V (vs. $Li^+$/Li) during discharge of the PC- and SC-NMC811 cells in the first 70 cycles, plotted in every 10 cycles. The voltage point of 3.67 V was chosen due to its known highest diffusion coefficient in NMC811, which allows for better differentiation in intrinsic impedance in the ASSB cell. In both Nyquist plots, semicircle-shaped curves and the Warburg elements appeared in the frequency region examined (from 1 MHz to ~10 mHz), which can be assigned to individual charge transport processes within the ASSB cell. While the bulk SE resistance ($R_{SE}$) from the halide SE separator layer appears at a very high-frequency region (>1 MHz), the charge transfer resistance within the grain boundary of SE evolves as a semi-circle in the high-frequency region of 1 MHz-1 kHz ($R_{HF}$). A semi-circle appeared in the mid-frequency region of 1 kHz — 10 Hz ($R_{ME}$) that can be assigned to the charge transfer resistance at the interface between NMC811 CAM and LYC SE. In addition, the semi-circle at the low-frequency region of <10 Hz ($R_{LF}$) can be assigned to the interfacial resistance between the LYC SE and In—Li alloy anode. The Warburg region (CPEw) represents the impedance of $Li^+$ ion diffusion within CAM. Data fitting using the components in the equivalent circuit is demonstrated on the EIS spectra collected at 3.67 V during the fourth discharge of PC-NMC811 and SC-NMC811, as shown in FIGS. 5C and 5D, respectively.

In both cells, the resistance of the LYC SE separator layer was determined to be ~80-85Ω, corresponding to an electrolyte layer thickness of ~350 μm and an ionic conductivity of 0.3 $mS \cdot cm^{-1}$. The $R_{MF}$ semi-circles maintained their initial shape over cycling, indicating that the CAM-LYC SE interphase was largely maintained. The slightly lower value in the SC cell suggests reduced charge transfer resistance at the interface between NMC811 and LYC SE, an indicator for better contact made between the two components. In both cases, $R_{MF}$ increases with cycling. However, the extent of resistance increase is much smaller in the SC cell, consistent with the better-maintained mechanical contact at the SC-NMC811/LYC interface. The most significant differences were observed on the semi-circle from $R_{LF}$ and $CPE_w$. Specifically, the extent of impedance increase from the PC cell is much larger than that in the SC cell, indicating higher resistance for solid-state $Li^+$ diffusion within the PC-NMC811 particles. We note that although the impedance evolution at the interface between LYC SE and Li—In anode also contributes to the changes in the $R_{LF}$+$CPE_w$ semi-circle, its contribution is expected to be similar in both cases. Diagnostic studies at the anode interface are under way. Here, $Li^+$ diffusion resistance from NMC811 can be considered as the main contributor to the observed differences in the semi-circles. It is clear that while the SC-NMC811 composite cathode also experienced increased $Li^+$ diffusion resistance upon cycling, the extent is significantly smaller than that in PC-NMC811. These results further confirm the unique advantage of using SC particles, which provide better $Li^+$ ion diffusion pathways due to their better mechanical properties for continuous cycling.

Example —Synthesis of the Single Crystal NMC and the Solid Electrolyte $Li_3YCl_6$solid electrolyte powder was prepared by the mechanochemical method. Stoichiometric mixtures of LiCl and $YCl_3$ were ground together in an agate mortar in an Ar-filled glove box. The mixture was then placed into a $ZrO_2$ ball mill jar with $ZrO_2$ balls, which was sealed before removing it from the glovebox. High-energy ball milling was carried out 550 rpm for 48 hours, using a planetary ball mill.

SC-NMC811 was synthesized by following the procedures described in U.S. Provisional Patent Application No. 63/210,335 and U.S. patent application Ser. No. 17/834,076.

Example—Cell Fabrication and Electrochemical Evaluation

To assemble the ASSB cells, the LYC SE layer was first pelletized at an external pressure of ~100 Mpa. A mixture of PC-NMC811 or SC-NMC811, LYC, and carbon black (Denka black, Denka Company Limited, Tokyo, Japan) in a specified ratio was ground together and then spread onto the LYC SE pellet. The assembly was pressed together to secure the contact between the CAM and SE layer. To add the anode layer, an In metal disk was placed onto the other side of the LYC pellet, followed by placing a Li metal disk onto the In disk. Li and In subsequently form a Li—In (3:7 molar ratio) alloy anode upon cell cycling. The assembled ASSB cell was then placed into a pressure jig where a constant pressure of ~8 Mpa was applied during cell cycling. Galvanostatic cycling was carried out in a voltage window of 3-4.3 V (vs $Li^+$/Li) for both PC-NMC811 and SC-NMC811 cell (1C=200 $mAhg^{-1}$). For the long-term cycling, the cells were cycled at 0.5 C for 200 cycles followed by 3 cycles at 0.2 C. The same sequence was repeated throughout the test.

CONCLUSION

Further details regarding the embodiments described herein can be found in Yanying Lu et al., "Single-Crystal $LiNi_xMn_yCo_{1-x-y}O_2$ Cathodes for Extreme Fast Charging", Small, Volume 18, Issue 12, Mar, 24, 2022, 2105833, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. An all solid-state battery comprising:

a composite cathode comprising $LiNi_xMn_yCo_{1-x-y}O_2$, x≥0.33, with about 80% or more of the $LiNi_xMn_yCo_{1-x-y}O_2$ comprising single crystals of $LiNi_xMn_yCo_{1-x-y}O_2$, about 90% or more of the single crystals of $LiNi_xMn_yCo_{1-x-y}O_2$ being polyhedron-shaped particles with (104)-family surfaces, the $LiNi_xMn_yCo_{1-x-y}O_2$ being uncoated, the $LiNi_xMn_yCo_{1-x-y}O_2$ being embedded in a matrix of a first lithium metal halide solid electrolyte comprising $Li_{6-3a}M_aX_6$, 0<a<2, M being an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof, and X being a halide from a group of chlorine (Cl), bromine (Br), iodine (I), and combinations thereof;

a separator, the separator comprising a second lithium metal halide solid electrolyte comprising $Li_{6-3b}N_bZ_6$, 0<b<2, N being an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof, and Z being a halide from a group of chlorine (Cl), bromine (Br), iodine (I), and combinations thereof; and an anode, the all solid-state battery being operable at about 4 volts and higher without reactions between the $LiNi_xMn_yCo_{1-x-y}O_2$ and the matrix of the first lithium metal halide solid electrolyte.

2. The all solid-state battery of claim 1, wherein about 95% or more of the $LiNi_xMn_yCo_{1-x-y}O_2$ comprises single crystals of $LiNi_xMn_yCo_{1-x-y}O_2$.

3. The all solid-state battery of claim 1, wherein about 95% or more of the single crystals of $LiNi_xMn_yCo_{1-x-y}O_2$ are polyhedron-shaped particles with (104)-family surfaces.

4. The all solid-state battery of claim 1, wherein the composite cathode comprises $LiNi_xMn_yCo_{1-x-y}O_2$, x≥0.8.

5. The all solid-state battery of claim 1, wherein single crystals of $LiNi_xMn_yCo_{1-x-y}O_2$ are $LiNi_{0.8}Co_{0.1}Mn_{0.1}O_2$.

6. The all solid-state battery of claim 1, wherein each of the single crystals of $LiNi_xMn_yCo_{1-x-y}O_2$ has a size of about 30 nanometers to 10 microns.

7. The all solid-state battery of claim 1, wherein each of the single crystals of $LiNi_xMn_yCo_{1-x-y}O_2$ has a size of about 3 microns to 5 microns.

8. The all solid-state battery of claim 1, wherein a weight percentage of the $LiNi_xMn_yCo_{1-x-y}O_2$ in the composite cathode is about 50% to 90%, and wherein a weight percentage of the first lithium metal halide solid electrolyte in the composite cathode is about 10% to 50%.

9. The all solid-state battery of claim 1, wherein the composite cathode further comprises carbon.

10. The all solid-state battery of claim 9, wherein a weight percentage of carbon in the composite cathode is about 0.1% to 5%.

11. The all solid-state battery of claim 9, wherein the carbon in the composite cathode comprises particles having a size of about 5 nanometers to 50 microns.

12. The all solid-state battery of claim 9, wherein a weight percentage of the $LiNi_xMn_yCo_{1-x-y}O_2$ in the composite cathode is about 57%, wherein a weight percentage of the first lithium metal halide solid electrolyte in the composite cathode is about 40.5%, and wherein a weight percentage of the carbon in the composite cathode is about 2.5%.

13. The all solid-state battery of claim 1, wherein particles of the first lithium metal halide solid electrolyte have a size of about 30 nanometers to 10 microns.

14. The all solid-state battery of claim 1, wherein the first lithium metal halide solid electrolyte and the second lithium metal halide solid electrolyte have different compositions.

15. The all solid-state battery of claim 1, wherein the first lithium metal halide solid electrolyte comprises comprise $Li_3YCl_6$, and wherein the second lithium metal halide solid electrolyte comprises $Li_3YCl_6$.

16. The all solid-state battery of claim 1, wherein the anode comprises Li metal.

17. The all solid-state battery of claim 1, wherein the anode comprises a LiA alloy, and wherein A is an element from a group of Mg, Si, In, and Sn.

18. The all solid-state battery of claim 1, wherein the anode comprises a LiIn alloy.

19. An all solid-state battery comprising:

a composite cathode comprising $LiNi_xMn_yCo_{1-x-y}O_2$, $x \geq 0.33$, with about 80% or more of the $LiNi_xMn_yCo_{1-x-y}O_2$ comprising single crystals of $LiNi_xMn_yCo_{1-x-y}O_2$, about 90% or more of the single crystals of $LiNi_xMn_yCo_{1-x-y}O_2$ being octahedron-shaped particles with (012)-family surfaces, $LiNi_xMn_yCo_{1-x-y}O_2$ being uncoated, the $LiNi_xMn_yCo_{1-x-y}O_2$ being embedded in a matrix of a first lithium metal halide solid electrolyte comprising $Li_{6-3a}M_aX_6$, $0<a<2$, M being an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof, and X being a halide from a group of chlorine (C1), bromine (Br), iodine (I), and combinations thereof;

a separator, the separator comprising a second lithium metal halide solid electrolyte comprising $Li_{6-3b}N_bZ_6$, $0<b<2$, N being an element from a group of magnesium (Mg), calcium (Ca), strontium (Sr), barium (Ba), scandium (Sc), indium (In), zirconium (Zr), niobium (Nb), hafnium (Hf), tantalum (Ta), yttrium (Y), lanthanum (La), samarium (Sm), bismuth (Bi), holmium (Ho), erbium (Er), ytterbium (Yb), and combinations thereof, and Z being a halide from a group of chlorine (Cl), bromine (Br), iodine (I), and combinations thereof; and an anode, the all solid-state battery being operable at about 4 volts and higher without reactions between the $LiNi_xMn_yCo_{1-x-y}O_2$ and the matrix of the first lithium metal halide solid electrolyte.

20. The all solid-state battery of claim 19, wherein about 95% or more of the single crystals of $LiNi_xMn_yCo_{1-x-y}O_2$ are octahedron-shaped particles with (012)-family surfaces.

* * * * *